No. 893,306. PATENTED JULY 14, 1908.
H. S. CLARK.
BRAKE HANGER.
APPLICATION FILED SEPT. 19, 1904.
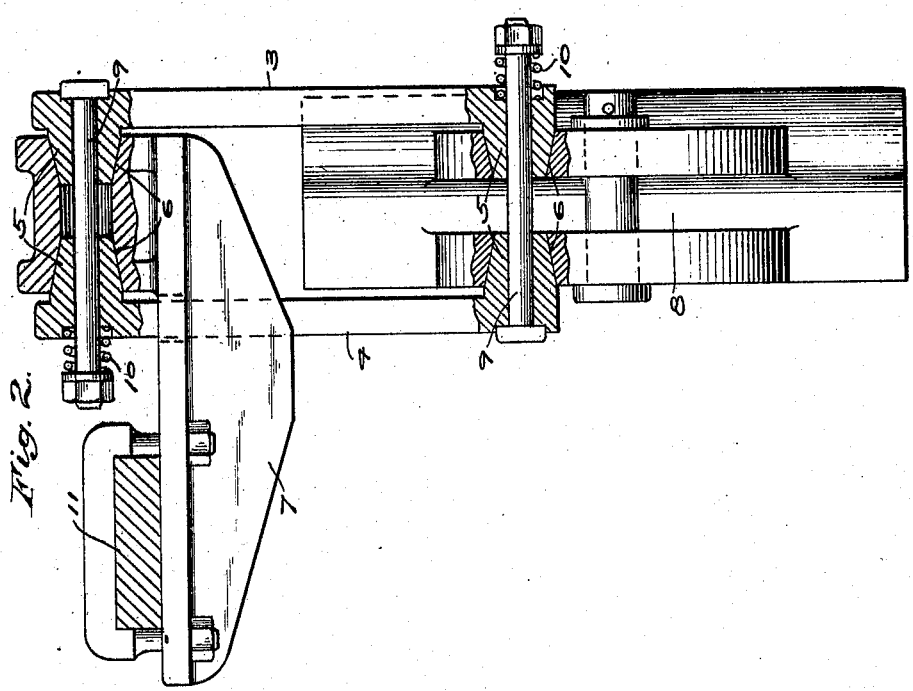
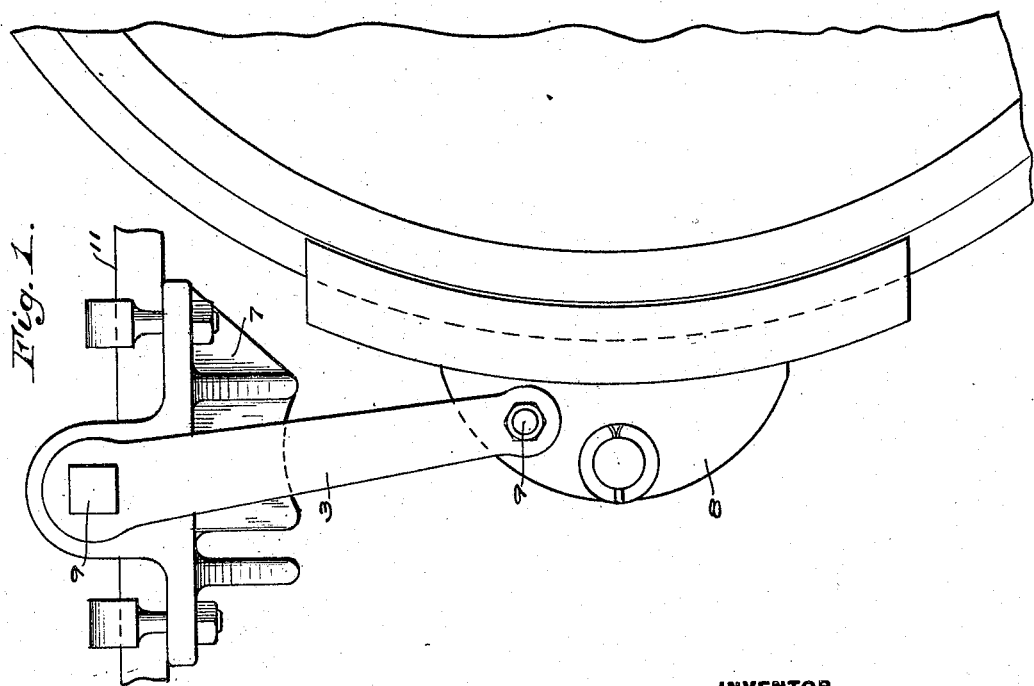
WITNESSES
INVENTOR
Horace S. Clark
by E. Wright
Att'y.

UNITED STATES PATENT OFFICE.

HORACE S. CLARK, OF LOS ANGELES, CALIFORNIA, ASSIGNOR TO THE WESTINGHOUSE AIR BRAKE COMPANY, OF PITTSBURG, PENNSYLVANIA, A CORPORATION OF PENNSYLVANIA.

BRAKE-HANGER.

No. 893,306.		Specification of Letters Patent.		Patented July 14, 1908.

Application filed September 19, 1904. Serial No. 225,108.

*To all whom it may concern:*

Be it known that I, HORACE S. CLARK, a citizen of the United States, residing in Los Angeles, county of Los Angeles, and State of California, have invented a certain new and useful Improvement in Brake-Hangers, of which the following is a specification.

This invention relates to hangers for brake shoes, and has for its object to provide means for automatically taking up the wear of the bearings or pivoted connections of the hanger and to thereby prevent the objectionable chattering of the brake shoes.

With the ordinary hanger, as is well known, when the bearing of the hanger pivot in the support or in the brake shoe becomes worn a very objectionable noise is caused by the rattling of the hanger bearings when the brake shoe is applied.

According to this invention the bearings of the hanger pivots are made tapering or conical and automatic means, such as a spring, is provided for taking up the wear and preventing any further looseness of the parts in the bearing.

In the accompanying drawing, Figure 1 is a side elevation showing a supporting bracket, hanger and brake shoe with a portion of a car wheel; and Fig. 2 is a view showing the pivoted hanger bearings in transverse section.

As shown in the drawing, the device is designed more particularly to be applied to street cars or electric cars, but it is obvious that the invention is also applicable to any and all kinds of railway or other vehicles.

For the purpose of illustration, the hanger is shown as formed of two similar parts or hanger bars 3 and 4, each having a tapered or conical bearing 5 projecting at each end and adapted to turn in oppositely tapered sockets 6 in the bracket 7 and also in the brake shoe or head 8.

A bolt or pin 9 passes through a central opening in each bearing and carries a spring 10 of the desired strength, which constantly tends to force the tapered hanger bearings into the conical sockets and automatically take up all the wear of the pivoted joint. The bracket may be supported from the car frame 11 in any convenient manner.

If desired, the two parts of the hanger may be made interchangeable and reversible.

As the conical bearing of the hanger in either the bracket or the brake head wears the spring acts automatically to draw the tapered portion of the hanger farther into the socket and thereby prevent any looseness of the parts of the joint, while at the same time the hanger is prefectly free to swing and does not bind at the pivots. By this means all rattling or chattering of the brake shoes is avoided and a very simple and efficient hanger construction is provided which adjusts itself automatically and requires but little attention or repairs.

Having now described my invention, what I claim as new and desire to secure by Letters Patent is:—

1. A brake hanger, comprising two hanger bars, one having a conical projection, a tapered socket forming a bearing for said projection, and a spring normally acting to force the conical projection into said socket.

2. A brake hanger, comprising a support or bracket having a tapered socket or bearing, two hanger bars, one on each side of the bearing, one of said bars having a conical projection for engaging said socket, and a spring normally tending to force the conical projection into the socket.

3. A brake hanger, comprising a support or bracket having a tapered socket or bearing, two hanger bars, one on each side of the bearing, a brake head having a tapered socket, the hanger bars having conical projections for engaging said sockets, and springs for normally forcing said projections into the sockets.

4. A brake hanger device, comprising a fixed bracket element, and a swinging element formed of a pair of hanger bars, one of these elements having opposite rigid tapered projections bearing in corresponding sockets of the other element, and means for automatically taking up the wear of the bearings.

5. A brake hanger device, comprising a fixed bracket element, and a swinging element formed of a pair of hanger bars, one of these elements having opposite rigid tapered projections bearing in corresponding sockets of the other element, and a spring mechanism for forcing the parts of the bearings together.

6. A brake hanger, comprising two hanger bars each having a conical projection or bearing at one end, oppositely tapered sockets, and a spring for forcing said bearings into the sockets.

7. A brake hanger, comprising two similar hanger bars, each having a conical projection at one end, oppositely tapered sockets, a bolt passing through central openings in said bearings, and a spring on said bolt for forcing said bearings into the tapered sockets.

8. The combination of a bracket having oppositely tapered sockets, hanger bars provided with conical projections or bearings, a brake head having oppositely tapered sockets and springs for forcing said conical bearings into the sockets in the bracket and in the brake head.

9. A brake hanger device, comprising a bracket element having a pair of tapered sockets, a pair of hanger bars having rigidly formed tapered projections bearing in said sockets, and means for automatically taking up the wear of the bearings.

10. A brake hanger device, comprising a bracket element having a pair of tapered sockets, a pair of hanger bars having rigidly formed tapered projections bearing in said sockets, and a spring mechanism acting to force the tapered projections into the sockets.

In testimony whereof I have hereunto set my hand.

HORACE S. CLARK.

Witnesses:
G. O. NOBLE,
E. B. HIGGINS.